US007366463B1

(12) United States Patent
Archer et al.

(10) Patent No.: US 7,366,463 B1
(45) Date of Patent: Apr. 29, 2008

(54) MILITARY UHF AND COMMERCIAL GEO-MOBILE SYSTEM COMBINATION FOR RADIO SIGNAL RELAY

(75) Inventors: Stephen F. Archer, El Segundo, CA (US); Richard H. Johnson, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/565,785

(22) Filed: May 5, 2000

(51) Int. Cl.
*H04B 7/185* (2006.01)

(52) U.S. Cl. .................... 455/13.1; 455/12.1; 455/427; 455/428; 455/429; 455/430; 455/3.01; 455/3.02; 455/13.3; 455/13.4; 455/25; 342/352; 342/353; 342/354; 370/315; 370/316

(58) Field of Classification Search ............... 455/12.1, 455/13.1–4, 552.1, 11.1, 3.01–6, 422.1, 427–431, 455/436–449, 25, 63.1–4, 553.1, 98, 103; 342/350–356, 357.01–17; 370/315–325
See application file for complete search history.

(56) References Cited

U.S. PATENT DOCUMENTS

| 4,145,658 | A | * | 3/1979 | Acampora et al. .......... 455/129 |
| 4,872,015 | A | * | 10/1989 | Rosen ........................ 342/353 |
| 5,003,534 | A | | 3/1991 | Gerhardt et al. ............ 370/322 |
| 5,282,250 | A | | 1/1994 | Dent et al. |
| 5,287,541 | A | * | 2/1994 | Davis et al. ................ 455/427 |
| 5,351,240 | A | | 9/1994 | Highsmith .................... 570/89 |
| 5,619,525 | A | * | 4/1997 | Wiedeman et al. ......... 375/130 |
| 5,699,355 | A | | 12/1997 | Natarajan .................... 370/322 |
| 5,721,534 | A | | 2/1998 | Olds et al. ............. 340/825.44 |
| 5,736,959 | A | | 4/1998 | Patterson et al. ........... 342/354 |
| 5,812,947 | A | | 9/1998 | Dent .......................... 455/427 |
| 5,864,579 | A | * | 1/1999 | Briskman .................... 375/200 |
| 5,920,814 | A | | 7/1999 | Sawyer et al. |
| 5,926,745 | A | | 7/1999 | Threadgill et al. ......... 455/12.1 |

(Continued)

FOREIGN PATENT DOCUMENTS

GB          2 319 699          5/1998

(Continued)

OTHER PUBLICATIONS

Talaie et al., "Radio Signal Broadcast System and Method", U.S. Appl. No. 09/522,297, filed on Apr. 19, 2000.

(Continued)

*Primary Examiner*—Tuan A. Tran

(57) ABSTRACT

A radio signal relay device such as satellite is used to cover several relatively small geographical regions with relatively narrow beams as well as a relatively large geographical region with a single beam. This relatively wide beam permits legacy equipment to be used. A transmitting device in a beam transmits a signal to the relay device, which in turn retransmits the signal to a receiving device. The transmitting devices, relay device, and receiving devices synchronize communication by using a particular mode of communication which includes a band of carrier frequencies and a protocol. In addition to communicating like mode signals from a transmitter to a receiver, the relay device may be used in a dual mode communication system to translate signals from the one mode to another. A translator may direct a transmitter to modulate a signal on a different carrier frequency, convert one protocol into another protocol, or both.

34 Claims, 4 Drawing Sheets

U.S. PATENT DOCUMENTS

| | | | |
|---|---|---|---|
| 5,963,846 A | 10/1999 | Kurby | |
| 6,014,372 A | 1/2000 | Kent et al. | 370/316 |
| 6,052,561 A | 4/2000 | Rudowicz et al. | |
| 6,067,045 A * | 5/2000 | Castelloe et al. | 342/357.09 |
| 6,067,442 A | 5/2000 | Wiedeman et al. | 455/13.1 |
| 6,088,571 A * | 7/2000 | Kane et al. | 455/12.1 |
| 6,125,261 A | 9/2000 | Anselmo et al. | 455/12.1 |
| 6,128,469 A * | 10/2000 | Zenick, Jr. et al. | 455/12.1 |
| 6,151,308 A | 11/2000 | Ibanez-Meier et al. | 370/316 |
| 6,160,994 A * | 12/2000 | Wiedeman | 455/12.1 |
| 6,272,317 B1 | 8/2001 | Houston et al. | 455/13.1 |
| 6,272,340 B1 | 8/2001 | Wright et al. | 455/427 |
| 6,285,868 B1 | 9/2001 | LaDue | |
| 6,292,661 B1 | 9/2001 | Patronen et al. | |
| 6,301,476 B1 * | 10/2001 | Monte et al. | 455/427 |
| 6,311,128 B1 * | 10/2001 | Prum et al. | 701/213 |
| 6,324,381 B1 | 11/2001 | Anselmo et al. | 455/12.1 |
| 6,336,030 B2 * | 1/2002 | Houston et al. | 455/13.2 |
| 6,396,826 B1 | 5/2002 | Ohlson et al. | |
| 6,400,925 B1 * | 6/2002 | Tirabassi et al. | 455/12.1 |
| 6,424,717 B1 | 7/2002 | Pinder et al. | 380/239 |
| 6,430,391 B1 | 8/2002 | Dent et al. | |
| 6,477,370 B1 | 11/2002 | Sigler et al. | 455/427 |
| 6,493,322 B1 | 12/2002 | Chennakeshu et al. | |
| 6,711,398 B1 | 3/2004 | Talaie et al. | |
| 6,985,716 B2 | 1/2006 | Talaie et al. | 455/427 |
| 7,120,434 B2 | 10/2006 | Talaie et al. | |
| 2004/0072570 A1* | 4/2004 | Smith | 455/446 |

FOREIGN PATENT DOCUMENTS

| | | | |
|---|---|---|---|
| GB | 2 320162 | 6/1998 | |
| JP | 5183489 | * 7/1993 | 455/FOR. 206 |
| WO | WO 97/37442 | 10/1997 | |

OTHER PUBLICATIONS

Talaie et al., "Geo-Mobile Satellite System Configuration With High-Speed Data Capability", U.S. Appl. No. 09/552,296, filed Apr. 19, 2000.

U.S. Appl. No. 10/418,492, filed Apr. 18, 2003, Talaie et al.

Gang Wu et al., Dynamic TDMA wireless Integrated Voice/Data System with Data Steal Into Voice (DSV) Technique, IEEE Nov. 1995, vol. 2, pp. 1473-1481.

* cited by examiner

MILITARY UHF AND COMMERCIAL GEO-MOBILE SYSTEM COMBINATION FOR RADIO SIGNAL RELAY

CROSS REFERENCE TO RELATED APPLICATIONS

This application is related to the following United States patent applications:

Ser. No. 09/552,297, filed Apr. 19, 2000, now issued as U.S. Pat. No. 6,711,398;

Ser. No. 10/418,492, which is a divisional application of Ser. No. 09/552,297, filed on Apr. 18, 2003 and now issued as U.S. Pat. No. 6,985,716;

Ser. No. 11/254,322, which is a continuation of Ser. No. 10/418,492, filed Oct. 20, 2005 and now issued as U.S. Pat. No. 7,120,434;

Ser. No. 11/517,074, which is a continuation of Ser. No. 11/254,322, filed Sep. 7, 2006; and Ser. No. 09/522,296, filed Apr. 19, 2000, now abandoned.

TECHNICAL FIELD OF THE INVENTION

The present invention relates in general to radio signal relay systems and more specifically to devices having dual mode communication.

BACKGROUND OF THE INVENTION

Radio communication systems rely on modulating carrier frequencies in a finite portion of the electromagnetic spectrum to wirelessly transmit and receive signals. Modulation can be performed on the amplitude, frequency, and/or phase of the carrier signal to separate the carrier from unwanted noise. The information portion of the signals typically conveys information such as voice, video, and computer data between transmitting/receiving devices such as voice terminals (e.g., wireless phone) and data terminals (e.g., portable computer).

In order to transmit the signals over a large distance, a relay such as a satellite may be used. Passive communication satellites may be used to return transmitted signals to earth on the same carrier frequency they were transmitted on. Active communication satellites can be used to receive the transmitted signals on one carrier frequency and to retransmit the signals on another carrier frequency. Geosynchronous satellites are especially well suited for such a task due to their stationary position relative to the earth's surface.

A rapid increase in the number of voice/data terminals that are in service, as well as new data intensive applications, has created a demand for a corresponding increase in the capacity and speed of many communication systems. Advances in underlying technology and changes in communication regulations allow communication systems to be implemented with increased capacity, increased coverage, higher speeds, lower costs, and smaller equipment. However, a practical problem with changing over from older to newer technologies is that large investments in equipment retard the transition to state of the art equipment. For example, large investments in military equipment operating in the Ultra High Frequency (UHF) band require on-going heritage interoperability with new digital systems thereby requiring new investments in digital beam forming satellite equipment operating in L and S bands.

SUMMARY OF THE INVENTION

The present invention relates to relaying radio signals in multi-mode communication systems. The present invention overcomes expensive system transitions to exclusive communication techniques by employing a system and device for communicating two or more distinct modes (i.e., carrier frequency and protocol) of signals wherein transmitting devices transmit signals to relay devices which, in turn, optionally translate the signal to a different mode and then retransmit the signals. The signals are then recovered by receiving devices preferably in one or more beams of a satellite, wherein the satellite is adapted for both narrow beam (e.g., Geo-mobile) and wide beam (e.g., UHF) communication.

In accordance with a first aspect of the present invention a dual mode communication system is provided. The system comprises a transmitting device for transmitting a signal in a first mode. The system also comprises a relay device for receiving the signal in the first mode, translating the signal to a second mode, and transmitting the signal in the second mode. Further, the system is provided with a receiving device for receiving the signal in the second mode.

In some preferred embodiments, the transmitting device comprises a voice terminal and/or a data terminal. Preferably, the transmitting device comprises a time-division multiple access communication device, a code-division multiple access communication device, and/or a frequency-division multiple access communication device. Also preferably, the transmitting device is coupled to a communications network. In such an instance, the communications network may comprise a public switched telephone network or the Internet.

In certain preferred embodiments, the first mode comprises a first protocol and a first band of carrier frequencies. In such an instance, the first band of frequencies may comprise an Ultra High Frequency (UHF) band, an L-band, S-band, C-band, X-band, Ku-band, and/or Ka-band. Also preferably, the relay device may comprise a satellite. In such an instance, the satellite may comprise a digital beam forming geosynchronous communications satellite. In any case, the relay device may comprise a time-division multiple access, code-division multiple access, and/or frequency-division multiple access communication device.

In a preferred embodiment, the second mode comprises a second protocol and a second band of carrier frequencies. In such an instance, the second band of frequencies may comprise an Ultra High Frequency (UHF) band, an L-band, S-band, C-band, X-band, Ku-band, and/or Ka-band. Also preferably, the receiving device may comprise a voice terminal and/or data terminal. In any case, the receiving device may comprise a time-division multiple access, code-division multiple access, and/or frequency-division multiple access communication device. In some preferred embodiments, the receiving device is coupled to a communications network. In such an instance, the communications network may comprise a public switched telephone network and/or the Internet.

In accordance with another aspect of the present invention, a radio signal relay device is provided. The device comprises a first receiver for receiving signals in a first mode and a first transmitter for transmitting signals in the first mode. In addition, the device comprises a second receiver for receiving signals in a second mode and a second transmitter for transmitting signals in the second mode.

In some preferred embodiments, the device further comprises a first translator for translating first mode signals into second mode signals and/or a second translator for translating second mode signals into first mode signals. Also preferably, the relay device may comprise a satellite. In such an instance, the satellite may comprise a digital beam forming geosynchronous communications satellite. In any case, the relay device may comprise a time-division multiple access, code-division multiple access, and/or frequency-division multiple access communication device.

In certain preferred embodiments, the first and/or second signals originate at a voice terminal and/or a data terminal. Further, in a preferred embodiment, the first and second modes comprises first and second protocols and first and second bands of carrier frequencies. In either instance, the band of frequencies may comprise an Ultra High Frequency (UHF) band, an L-band, S-band, C-band, X-band, Ku-band, and/or Ka-band. Additionally in some preferred embodiments, the first and/or second signals are destined for a voice terminal and/or a data terminal.

BRIEF DESCRIPTION OF THE DRAWINGS

These and other features and advantages of the present invention will become more apparent from a consideration of the following detailed description of certain preferred embodiments when taken in conjunction with the drawings in which.

DETAILED DESCRIPTION OF THE PREFERRED EMBODIMENTS

Although the following description focuses on systems and devices for relaying dual mode radio signals using a satellite, persons of ordinary skill in the art will readily appreciate the techniques of the present invention are in no way limited to dual mode radio signals or satellites. On the contrary, any system with multiple modes of communication and/or the need to relay signals may benefit from the techniques described and illustrated herein. For example, wired or wireless communication systems transmitting information to and from a plurality of devices could employ the techniques provided herein without departing from the scope of the invention.

Figure 1:
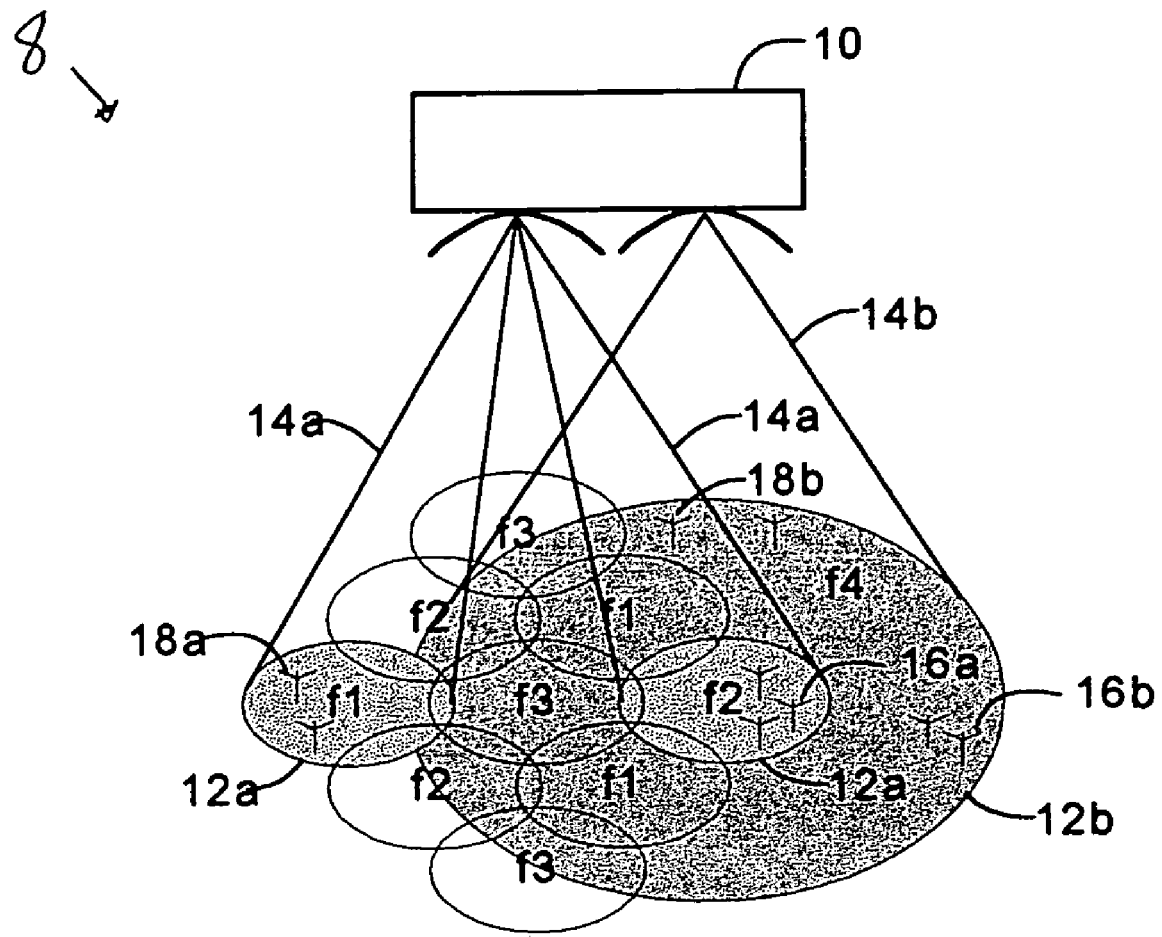
FIG. 1 is a diagram of a communication system capable of utilizing the teachings of the present invention.

A diagram of a communication system 8 for communicating radio signals, capable of utilizing the teachings of the present invention, is shown in FIG. 1. A radio signal relay device 10, such as a beam forming satellite, is used to cover several relatively small geographical regions 12a. Beams 14a with sufficient angular separation may share frequencies in order to increase communication capacity without increasing the allocated bandwidth. For example, by separating one beam using frequency f1 by other beams using frequencies f2 and f3, another beam may reuse frequency f1. Further, these relatively narrow beams 14a have higher gain than relatively wide beams and, therefore, smaller antennas may be used on receiving devices 16a. Preferably, a ground-based transmitting device 18a in a first beam 14a transmits a signal to the relay device 10, which in turn retransmits or transfers the signal to a ground-based receiving device 16a. Alternatively, a transmitting device 18a in a first beam 14a transmits a signal to the relay device 10, which in turn retransmits or transfers the signal to a ground station. Processing, such as translation, may occur at the ground station and then the signal is transmitted to the relay device 10 again. Finally, the relay device 10 retransmits or transfers the signal to a receiving device 16a. In either case, the receiving device 16a may be in the same beam 14a as the transmitting device 18a or a different beam 14a.

The transmitting device 18a and the relay device 10 communicate by using a first mode of communication. Similarly, the relay device 10 and the receiving device 16a communicate by using the first mode of communication. The first mode of communication includes an uplink carrier frequency, a down link carrier frequency, and a protocol. The carrier frequencies are preferably in a band of frequencies allocated for narrow beam satellite communication, such as the L-band, S-band, C-band, X-band, Ku-band and/or an Ka-band of frequencies. However, persons of ordinary skill in the art will readily appreciate that any frequency or band of frequencies may be used in the spirit of the present invention. The protocol comprises a set of conventions to transfer the signal, such as data format, timing, error detection, and error correction. The protocol may be any format for information exchange including code division multiple access (CDMA), time division multiple access (TDMA), and/or frequency division multiple access (FDMA).

The relay device 10 may also be used to cover a single relatively large geographical region 12b. The large geographical region 12b preferably intersects with some or all of the small geographical regions 12a. A single beam 14b uses a band of frequencies preferably in a distinct portion of the electromagnetic spectrum, such as the UHF band of frequencies. This relatively wide beam 14b permits older equipment, often already in a customer's infrastructure, to be used by using older protocols and by operating at frequencies used by such equipment. A transmitting device 18b transmits a signal to the relay device 10, which in turn retransmits the signal to a receiving device 16b. For example, existing military UHF communication equipment may use such a wide beam system.

The transmitting device 18b and the relay device 10 communicate by using a second mode of communication. Similarly, the relay device 10 and the receiving device 16b communicate by using the second mode of communication. The second mode of communication includes an uplink carrier frequency, a down link carrier frequency, and protocol. The carrier frequencies are preferably in a band of frequencies allocated for wide beam satellite communication, such as the Ultra High Frequency (UHF) band of frequencies. However, persons of ordinary skill in the art will readily appreciate that any frequency or band of frequencies may be used in the spirit of the present invention. As before, the protocol may be any standard format for information exchange including code division multiple access (CDMA), time division multiple access (TDMA), and/or frequency division multiple access (FDMA).

This hybrid system offers the ability to use older wide beam equipment in conjunction with new narrow beam equipment. Using older wide beam equipment saves upgrade costs and provides low data rate communications (e.g., fax). Using newer narrow beam equipment allows higher capacity and new features such as point-to-point communication, high speed data communication, and netted voice communication in multiple geographic regions. Further, the narrow beam equipment can dynamically focus and set up its theatre of operation, for example, a particular military conflict region(s). By using a UHF system for wide area coverage and a Geo-Mobile system for narrow beam coverage, high traffic densities may be supported in selected areas without eliminating coverage in other areas.

Figure 2:
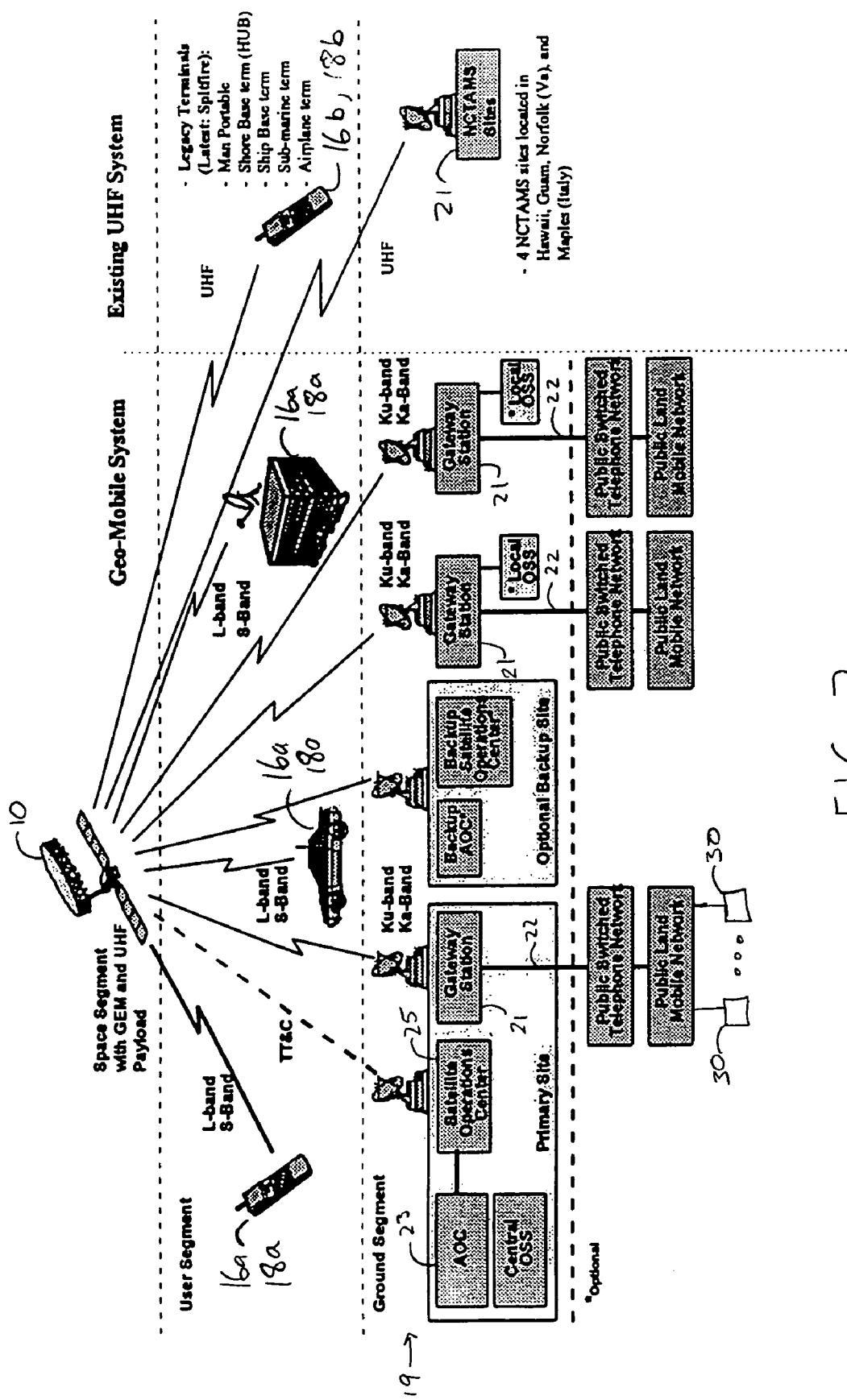
FIG. 2 is a system level diagram of the communication system of FIG. 1.

A Geo-Mobile (GEM) voice and/or data terminal could be used to transmit signals to a mobile satellite system (MSS) employing a geosynchronous satellite 10 and a ground segment 19 (FIG. 2). The ground segment 19 could include a gateway station (GS) 21 that is interfaced to a public switched telephone network (PSTN) 22, a public land mobile network (PLMN), and/or a public switched data network (PSDN) allowing GEM voice/data terminals 16a, 18a to communicate with other terminals 30 associated with the PSTN, PLMN, and PSDN systems as well as other GEM terminals 16a, 18a. The ground segment 19 could also include an advanced operations center (AOC) 23 and a satellite operations center (SOC) 25. The AOC 23 manages the satellite payload and resources (e.g., time, frequency, and power). Further, the AOC 23 could monitor and control various service providers. The SOC 25 could manage and control functions such as telemetry tracking and control, bus sub-system and payload repeater anomaly correction, turn-around and range, and satellite attitude and positioning. In the preferred embodiment, the ground control infrastructure for the UHF and GEM systems is combined.

Concurrently, an Ultra High Frequency (UHF) voice and/or data terminal 16b, 18b could be used to transmit signals to the satellite 10 configured to handle both GEM and UHF payloads. A UHF ground segment preferably includes four NCTAMS sites located in Hawaii, Guam, Norfolk (VA), and Naples (Italy). The UHF system provides earth coverage receive and transmit antennas and electronics, the relay 17 25 kH$_z$ and 21 5 kH$_z$ channels. Various frequency use plans provide isolation of channels (both transmit and receive) on individual satellites as well as between satellites sharing a footprint. UHF operating frequencies enables communications with ground terminals equipped with omnidirectional antennas. The UHF channels can support point-to-point voice, netted voice, teletype, and low speed data communication. Optionally, the ground segment is interfaced to a network (e.g., PSTN, PLMN, PSDN). It will be appreciated by persons of ordinary skill in the art that the ground segments of the GEM system may be advantageously combined with the ground segment of the UHF system.

Figure 3:
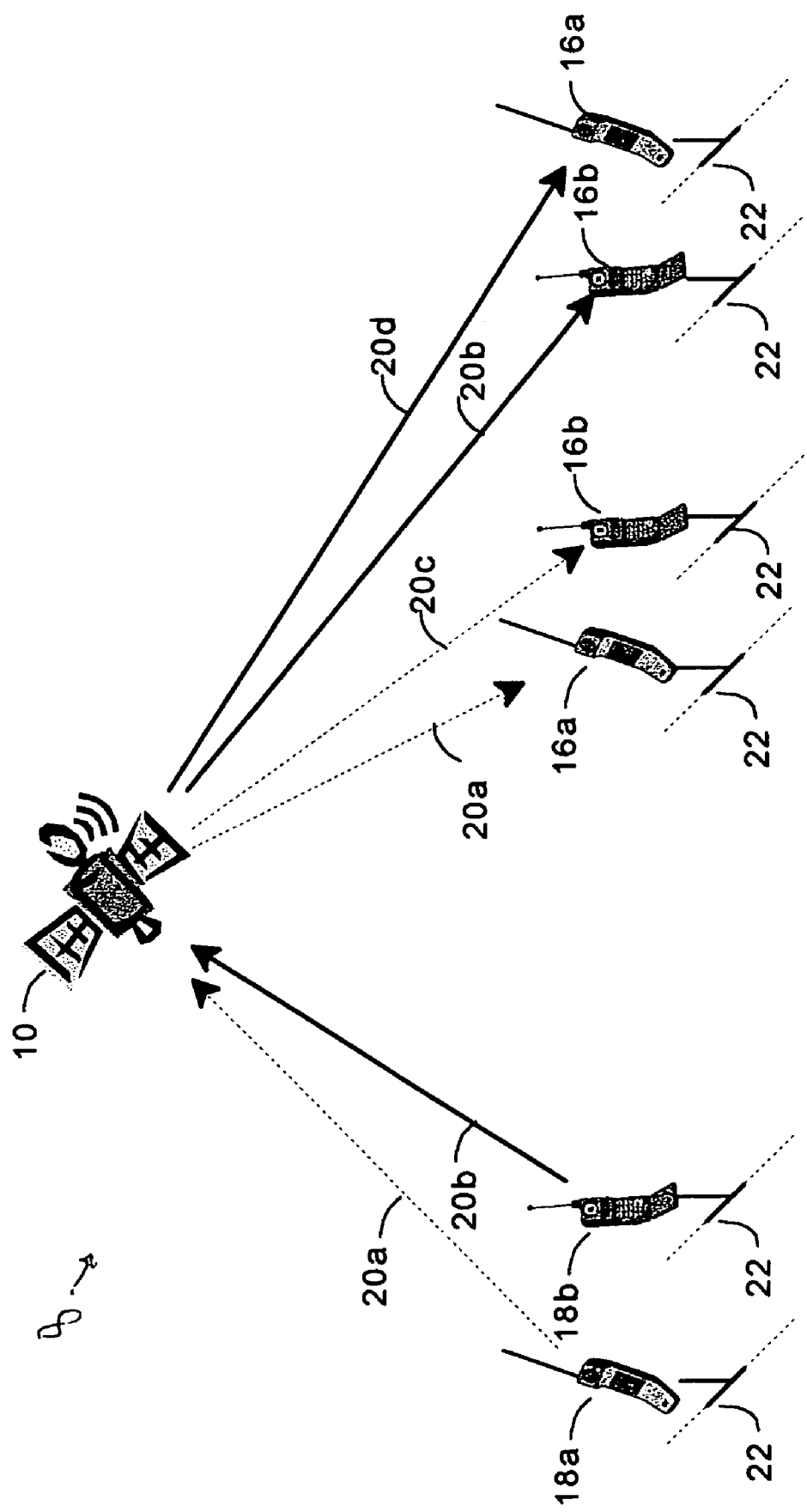
FIG. 3 is a more detailed diagram of the communication system of FIG. 1.

A more detailed block diagram of the communication system 8 of FIG. 1 is illustrated in FIG. 3. A first transmitting device 18a is used to transmit a first signal in a first mode 20a to the relay device 10. The first transmitting device 18a may be a voice terminal, such as a wireless telephone, a data terminal, such as a portable computer, a gateway station, or any other transmitting device. The first transmitting device 18a is optionally coupled to a communications network 22, such as a public switched telephone network, the Internet, or any other network. The signal 20a is preferably a voice signal, such as an analog voice signal or digitally encoded voice signal, but could be a data signal, such as a data signal originating from a computer, or any other signal. The first mode comprises a band of carrier frequencies and a protocol. The first mode carrier frequency is preferably a frequency in a band of frequencies allocated for satellite communication, such as the Ultra High Frequency (UHF) band, L-band, S-band, C-band, X-band, Ku-band and/or an Ka-band of frequencies. However, persons of ordinary skill in the art will readily appreciate that any frequency or band of frequencies may be used in the spirit of the present invention.

Preferably, the relay device 10 receives the signal 20a by demodulating the first mode carrier frequency and optionally decoding the signal 20a using the first mode protocol. Subsequently, the relay device 10 retransmits the signal 20a using the first mode (i.e. on a carrier frequency in the first mode band and using the first mode protocol). Alternatively, the relay device 10 may simply transfer the signal without demodulation or decoding. The relay device 10 is preferably a satellite, such as a digital beam forming geosynchronous communications satellite, but could be any device capable of receiving, optionally processing, and re-transmitting signals, such as a cellular base station.

The signal 20a is then recovered at a receiving device 16a by demodulating the retransmitted first mode carrier frequency. Like the transmitting device 18a, the receiving device 16a may be a voice terminal, such as a wireless telephone, a data terminal, such as a portable computer, a gateway station, or any other receiving device. Also like the transmitting device 18a, the receiving device 16a is optionally coupled to a communications network 22 such as a public switched telephone network, the Internet, or any other network.

Similarly, a second transmitting device 18b is used to transmit a second signal in a second mode 20b to the relay device 10. The second transmitting device 18b is also preferably a voice terminal, such as a wireless telephone, but could be a data terminal, such as a portable computer, or any other transmitting device. The second transmitting device 18b is optionally coupled to a communications network 22, such as a public switched telephone network, the Internet, or any other network. The signal 20b is preferably a voice signal, such as an analog voice signal or digitally encoded voice signal, but could be a data signal, such as data originating from a computer, or any other signal. The second mode comprises a band of carrier frequencies and a protocol. The second mode carrier frequency is preferably a frequency in a band of frequencies allocated for satellite communication, such as the Ultra High Frequency (UHF) band, L-band, S-band, C-band, X-band, Ku-band and/or an Ka-band of frequencies. However, persons of ordinary skill in the art will readily appreciate that any frequency or band of frequencies may be used in the spirit of the present invention.

The relay device 10 receives the signal 20b by demodulating the second mode carrier frequency and optionally decoding the signal 20b using the second mode protocol. Subsequently, the relay device 10 retransmits the signal 20b using the second mode (i.e. on a carrier frequency in the second mode band and using the second mode protocol). Alternatively, the relay device 10 may simply translate the signal without demodulation or decoding. The relay device 10 is preferably a satellite, such as a digital beam forming geosynchronous communications satellite, but could be any device capable of receiving and re-transmitting signals, such as a cellular base station.

The signal 20b is then recovered at a receiving device 16b by demodulating the retransmitted second mode carrier frequency. Like the transmitting device 18b, the receiving device 16b is preferably a voice terminal, such as a wireless telephones, but could be a data terminal, such as portable computers, or any other receiving devices. Also like the transmitting device 18b, the receiving device 16b is optionally coupled to a communications network 22 such as a public switched telephone network, the Internet, or any other network.

In the described communication systems 8, the transmitting device(s) 18, relay device 10, and/or receiving devices 16 are preferably cooperating members of a multiple access system such as a time division multiple access (TDMA)

system, code division multiple access (CDMA) system, and/or frequency division multiple access (FDMA) system.

In addition to communicating like mode signals from a transmitter 18 to a receiver 16, the relay device 10 may be used in a dual mode communication system to translate signals 20 from the first mode to the second mode and/or from the second mode to the first mode. For example, a signal 20a transmitted by a transmitting device 18a using the first mode may be received by the relay device 10 and translated to the second mode. Subsequently, the relay device 10 transmits a signal 20b in the second mode containing substantially equivalent information to the first mode signal 20a. The second mode signal 20b is then received by a receiving device 16b using the second mode. Similarly, a signal 20b transmitted by a transmitting device 18b using the second mode may be received by the relay device 10 and translated to the first mode. Subsequently, the relay device 10 transmits a signal 20d in the first mode containing substantially equivalent information to the second mode signal 20b. The first mode signal 20d is then received by a receiving device 16a using the first mode. Further, any signal may be transmitted in both modes. Still further, it will be readily appreciated by persons of ordinary skill in the art that dual-mode transmitting and/or receiving devices may be used.

Figure 4:
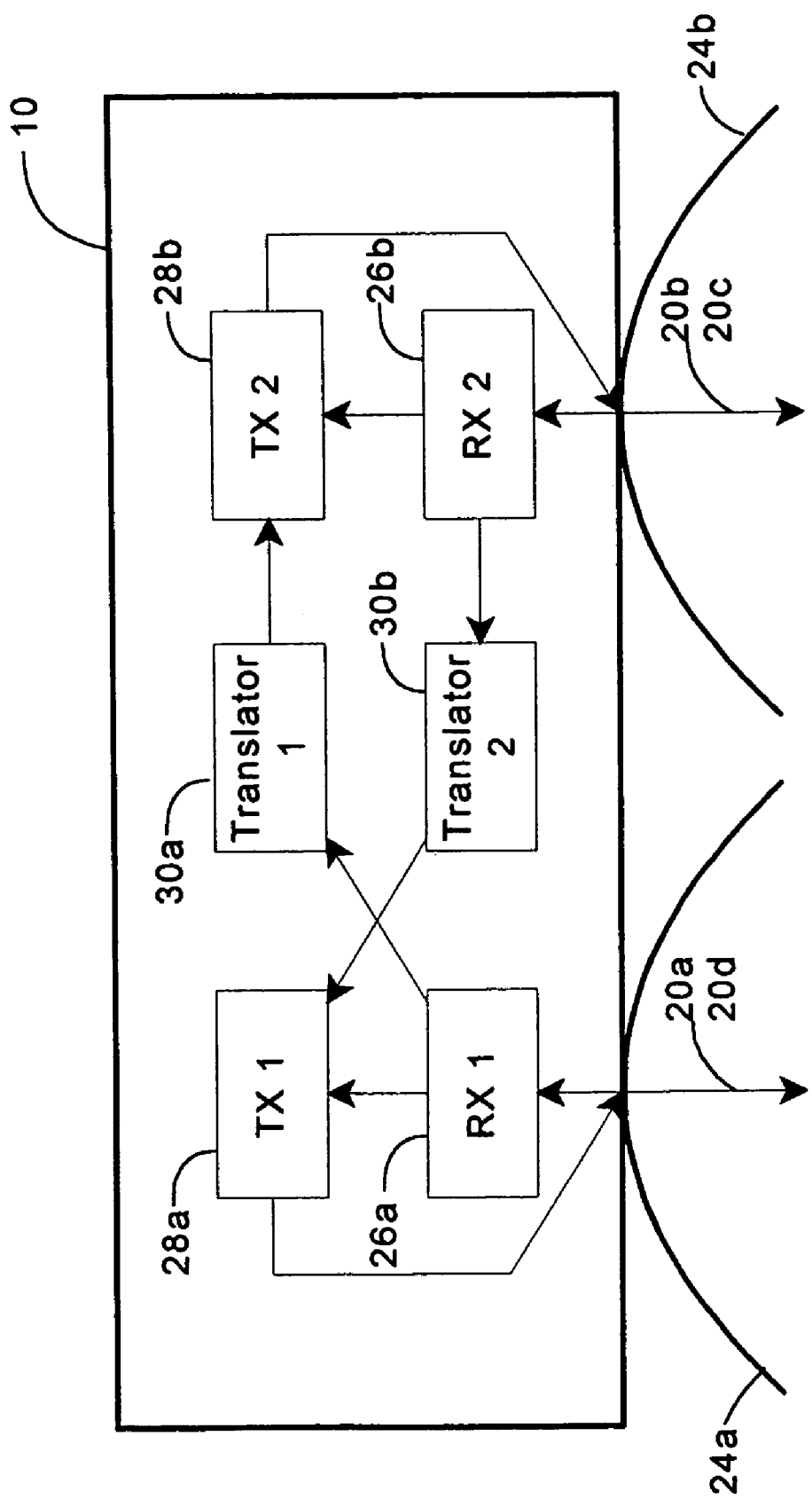
FIG. 4 is a more detailed diagram of the relay device shown in FIG. 1 and embodying the present invention.

A more detailed diagram of the radio signal relay device 10 is shown in FIG. 4. A first transceiving dish or antenna 24a receives first mode signals 20a at a first receiver 26a. The signal 20a can then be passed along to a first transmitter 28a or a first translator 30a. Similarly, a second transceiving dish or antenna 24b receives second mode signals 20b at a second receiver 26b. The signal 20b can then be passed along to a second transmitter 28b or a second translator 30b. Signals 20a arriving at the first transmitter 28a from the first receiver 26a and/or the second translator 30b may be transmitted as first mode signals 20a, 20d via the first transceiving dish 24a. Similarly, signals 20b arriving at the second transmitter 28b from the second receiver 26b and/or the first translator 30a may be transmitted as second mode signals 20b, 20c via the second transceiving dish 24b. In an alternate embodiment, the first antenna 24 and the second antenna 24B may be combined into a single antenna for transmitting and receiving both UHF and GEM payloads interoperatively.

The first translator 30a is used to translate signals in a first mode 20a to signals in a second mode 20b. The second translator 30b is used to translate signals in a second mode 20b to signals in a first mode 20a. The translators 30 may be implemented with a microprocessor, application specific integrated circuit (ASIC), and/or any electrical circuit and/or software combination. A translator 30 may direct a transmitter 28 to modulate a signal 20 on a different carrier frequency, convert one protocol into another protocol, or both.

In summary, persons of ordinary skill in the art will readily appreciate that a system and device for relaying dual mode signals has been provided. Systems and devices implementing the teachings of the invention can enjoy decreased satellite costs, decreased launch costs, flexible geographic regions of operation, legacy support, increased capacity (e.g., additional narrow band, Geo-mobile payload) allowing support for commercial users and smaller terminal devices.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A dual mode satellite communication system receiving satellite control commands from a gateway station, the gateway station used solely for sending commands to the dual mode satellite communication system and interfacing the dual mode satellite communication system with a public switched telephone network, comprising:
   a first mobile ground-based communications device for transceiving a low-gain signal in a first mode, wherein the first mode includes a first protocol and a first band of carrier frequencies;
   a second mobile ground-based communications device for transceiving a high-gain signal in a second mode, wherein the second mode includes a second protocol and a second band of carrier frequencies, and wherein the first mobile ground-based communications device is disposed within a first region defined by a low gain beam and the second mobile ground-based communications device is within a second region defined by a high gain beam intersecting the first region;
   a satellite-based relay device, including:
   a low-gain communications system having a low-gain receiver and a low-gain transmitter, and
   a high-gain communications system having a high-gain receiver and a high-gain transmitter, the high-gain communications system configured for transceiving a plurality of angularly separated frequency sharing high-gain signals, and
   at least one translator interoperatively coupled between the low-gain communications system and the high-gain communications system,
   wherein the satellite-based relay device is configured for receiving the low-gain signal in the first mode, translating the low-gain signal to the high-gain signal in the second mode, and transmitting the high-gain signal in the second mode, wherein the satellite based relay device transceives information generated by and between the first mobile ground-based comminations device directly with information generated by and between the second mobile ground-based communications device without transceiving with a gateway station.

2. The system as defined in claim 1, wherein the first mobile ground-based communications device comprises one or more of the group consisting of a voice terminal, a data terminal, a time-division multiple access communication device, a code-division multiple access communication device, and a frequency-division multiple access communication device.

3. The system as defined in claim 1, wherein the first mobile ground-based communications device is coupled to a communications network.

4. The system as defined in claim 3, wherein the communications network comprises one or more of the group consisting of a public switched telephone network, a public land mobile network, and the Internet.

5. The system as defined in claim 1, wherein the first band of carrier frequencies comprises one or more of the group consisting of an Ultra High Frequency (UHF) band, an L-band, an S-band, a C-band, an X-band, a Ku-band, and a Ka-band.

6. The system as defined in claim 1, wherein the satellite-based relay device comprises a digital beam forming geosynchronous communications satellite.

7. The system as defined in claim 1, wherein the satellite-based relay device comprises one or more of the group consisting of a time-division multiple access communication device, a code-division multiple access communication device, and a frequency-division multiple access communication device.

8. The system as defined in claim 1, wherein the second band of frequencies comprises one or more of the group consisting of an Ultra High Frequency (UHF), an L-band, an S-band, a C-band, an X-band, a Ku-band, and a Ka-band.

9. The system as defined in claim 1, wherein the second mobile ground-based communications device comprises one or more of the group consisting of a voice terminal, a data terminal, a time-division multiple access communication device, a code-division multiple access communication device, and a frequency-division multiple access communication device.

10. The system as defined in claim 1, wherein the second mobile ground-based communications device is coupled to a communications network comprising one or more of the group consisting of a public switched telephone network, a public land mobile network, and the Internet.

11. The system as defined in claim 1, wherein the low-gain system is a UHF system and the high-gain system is a Geo-Mobile system.

12. A satellite-based radio signal relay device receiving satellite control commands from a gateway station, the gateway station used solely for sending commands to the satellite-based radio signal relay device and interfacing the satellite-based radio signal relay device with a public switched telephone network, comprising:
  a first receiver for receiving low-gain signals in a first mode, wherein the first mode includes a first protocol and a first band of carrier frequencies;
  a first transmitter for transmitting the low-gain signals in the first mode;
  a second receiver for receiving high-gain signals in a second mode, wherein the second mode includes a second protocol and a second band of carrier frequencies, wherein the first receiver receives signals generated in a first geographic region and the second receiver receives signals generated in a second region, the first region intersecting the second region; and
  a second transmitter for transmitting a plurality of angulary separated frequency sharing high-gain signals in the second mode, wherein the plurality of angulary separated frequency sharing high-gain signals are narrow beam signals, and wherein the satellite-based radio signal relay device translates signals between the first mode and the second mode directly between at least a plurality of mobile ground-based communications devices without communicating with a gateway station.

13. The satellite-based radio signal relay device as defined in claim 12, further comprising a first translator for translating first mode signals into second mode signals.

14. The satellite-based radio signal relay device as defined in claim 12, further comprising a second translator for translating second mode signals into first mode signals.

15. The satellite-based radio signal relay device as defined in claim 12, wherein the satellite-based radio signal relay device comprises a digital beam forming geosynchronous communications satellite.

16. The satellite-based radio signal relay device as defined in claim 12, wherein the satellite-based radio signal relay device comprises one or more of the group consisting of a time-division multiple access communication device, a code-division multiple access communication device, and a frequency-division multiple access communication device.

17. The satellite-based radio signal relay device as defined in claim 12, wherein the low-gain signals originate at one or more of the group consisting of a voice terminal, a data terminal, a time-division multiple access communication device, a code-division multiple access communication device, and a frequency-division multiple access communication device.

18. The satellite-based radio signal relay device as defined in claim 12, wherein the first band of frequencies comprises one or more of the group consisting of an Ultra High Frequency (UHF) band, an L-band, an S-band, a C-band, an X-band, a Ku-band, and a Ka-band.

19. The satellite-based radio signal relay device as defined in claim 12, wherein the low-gain signals are destined for one or more of the group consisting of a voice terminal, a data terminal, a time-division multiple access communication device, a code-division multiple access communication device, and a frequency-division multiple access communication device.

20. The satellite-based radio signal relay device as defined in claim 12, wherein the high-gain signals originate at one or more of the group consisting of a voice terminal, a data terminal, a time-division multiple access communication device, a code-division multiple access communication device, and a frequency-division multiple access communication device.

21. The satellite-based radio signal relay device as defined in claim 12, wherein the second band of frequencies comprises one or more of the group consisting of an Ultra High Frequency (UHF) band, an L-band, an S-band, a C-band, an X-band, a Ku-band, and a Ka-band.

22. The satellite-based radio signal relay device as defined in claim 12, wherein the plurality of angularly separated frequency sharing high-gain signals are destined for one or more of the group consisting of a voice terminal, a data terminal, a time-division multiple access communication device, a code-division multiple access communication device, and a frequency-division multiple access communication device.

23. The satellite-based radio signal relay device as defined in claim 12, further comprising an antenna coupled to the first and second receivers, the first and second receivers interoperating first and second payloads, wherein the first payload comprises a military UHF payload, and the second payload comprises a commercial Geo-Mobile payload.

24. The satellite-based radio signal relay device as defined in claim 23, wherein the first and second payloads include facsimile payloads, point-to-point voice payloads, and point-to-point data payloads.

25. The satellite-based radio signal relay device as defined in claim 12, further comprising an antenna coupled to the first and second transmitters, the first and second transmitters interoperating first and second payloads, wherein the first payload comprises a military UHF payload, and the second payload comprises a commercial Geo-Mobile payload.

26. The satellite-based radio signal relay device as defined in claim 25, wherein the first and second payloads include facsimile payloads, point-to-point voice payloads, and point-to-point data payloads.

27. The satellite-based radio signal relay device as defined in claim 26, wherein complementary UHF-based wide area coverage and Geo-Mobile narrow beam coverage is used to support high traffic densities in selected areas.

28. A satellite-based radio signal relay device receiving satellite control commands from a gateway station, the gateway station used solely for sending commands to the satellite-based radio signal relay device and interfacing the satellite-based radio signal relay device with a public switched telephone network, comprising:
- a first payload for providing UHF-based wide area coverage including:
  - a first transmitter for transmitting low gain signals in a first mode, wherein the first mode includes a first protocol and a first band of carrier frequencies; and
  - a first receiver for receiving the low gain signals in the first mode; and
- a second payload for providing Geo-mobile narrow beam coverage including:
  - a second transmitter for transmitting a plurality of high-gain signals in a second mode, wherein the plurality of high-gain signals are angularly separated narrow beam signals providing for increased communications capacity, wherein the first transmitter transmits signals to a first geographic region and the second transmitter transmits signals to a second region, the first region intersecting the second region; and
  - a second receiver for receiving the plurality of high-gain signals in the second mode, wherein the second mode includes a second protocol and a second band of carrier frequencies, and wherein the satellite-based radio signal relay communicates information generated in and between the first region and the second region mode directly between at least a plurality of mobile ground-based communications devices without communicating with a gateway station.

29. A satellite based relay device receiving satellite control commands from a gateway station, the gateway station used solely for sending commands to the satellite-based radio signal relay device and interfacing the satellite-based radio signal relay device with a public switched telephone network, comprising:
- a receiver system, for receiving signals in a legacy mode or a non-legacy mode from one of a plurality of mobile ground based communication devices, the plurality of mobile ground based communication devices including legacy ground based communication devices and non-legacy ground based communication devices;
- a translator, for translating the received signals from the non-legacy mode to the legacy mode; and
- a transmitter system, for transmitting the translated received signals to one of the legacy ground based communications devices via a low power wide beam;
- wherein the one of the legacy ground based communication devices is disposed within a first region defined by the wide beam and the non-legacy ground based communication devices are within a second region defined by a narrow beam intersecting the first region and the satellite based relay device communicates information generated by and between the legacy ground based devices directly with the non-legacy ground based devices without communicating with a gateway station.

30. The satellite based relay device of claim 29, wherein at least one of the legacy ground based communication devices is a mobile device.

31. The satellite based relay device of claim 30, wherein the mobile device is a wireless phone.

32. A satellite based relay device receiving satellite control commands from a gateway station, the gateway station used solely for sending commands to the satellite-based radio signal relay device and interfacing the satellite-based radio signal relay device with a public switched telephone network, comprising:
- a receiver system, for receiving signals in a legacy mode or a non-legacy mode from one of a plurality of mobile ground based communication devices, the plurality of mobile ground based communication devices including legacy ground based communication devices and non-legacy ground based communication devices;
- a translator, for translating the received signals from the non-legacy mode to the legacy mode; and
- a transmitter system, for transmitting the translated received signals to one of the legacy ground based communications device via a low gain beam;
- wherein the one of the legacy ground based communication devices is disposed within a first region defined by the low gain beam and the non-legacy ground based communication devices are within a second region defined by a high gain beam intersecting the first region and the satellite based relay device communicates information generated by and between the legacy ground based devices directly with the non-legacy ground based devices without communicating with a gateway station.

33. The satellite based relay device of claim 32, wherein at least one of the legacy ground based communication devices is a mobile device.

34. The satellite based relay device of claim 33, wherein the mobile device is a wireless phone.

* * * * *